(12) United States Patent
Honoré et al.

(10) Patent No.: US 12,029,219 B2
(45) Date of Patent: Jul. 9, 2024

(54) CRISPY PASTRY PRODUCTS

(71) Applicant: VAMIX NV, Ghent (BE)

(72) Inventors: Eline Honoré, Ghent (BE); Thomas Josse, Torce (FR); Roel Van Der Meulen, Ghent (BE)

(73) Assignee: VAMIX NV, Ghent (BE)

( * ) Notice: Subject to any disclaimer, the term of this patent is extended or adjusted under 35 U.S.C. 154(b) by 0 days.

(21) Appl. No.: 18/022,616

(22) PCT Filed: Sep. 21, 2021

(86) PCT No.: PCT/EP2021/075856
§ 371 (c)(1),
(2) Date: Feb. 22, 2023

(87) PCT Pub. No.: WO2022/058601
PCT Pub. Date: Mar. 24, 2022

(65) Prior Publication Data
US 2023/0225337 A1    Jul. 20, 2023

(30) Foreign Application Priority Data

Sep. 21, 2020 (FR) ........................... 2009525
Oct. 28, 2020 (FR) ........................... 2011046

(51) Int. Cl.
*A21D 13/16* (2017.01)
*A21C 11/10* (2006.01)
*A21C 11/12* (2006.01)

(52) U.S. Cl.
CPC .............. *A21D 13/16* (2017.01); *A21C 11/10* (2013.01); *A21C 11/12* (2013.01)

(58) Field of Classification Search
CPC .......... A21D 13/16; A21C 11/10; A21C 11/12
See application file for complete search history.

(56) References Cited

U.S. PATENT DOCUMENTS

| | | |
|---|---|---|
| 2004/0052907 A1 | 3/2004 | Maniak et al. |
| 2006/0003054 A1 | 1/2006 | Goedeken et al. |
| 2017/0238560 A1* | 8/2017 | Cameron ................. A21D 2/36 |
| 2018/0295843 A1 | 10/2018 | Zeitz et al. |

FOREIGN PATENT DOCUMENTS

| | | |
|---|---|---|
| EP | 0305071 A2 | 3/1989 |
| EP | 0 663 150 A1 | 7/1995 |
| EP | 1 285 581 A2 | 2/2003 |
| EP | 2 172 109 A2 | 4/2010 |
| EP | 3622823 A1 | 3/2020 |

(Continued)

OTHER PUBLICATIONS

International Search Report and Written Opinion date Dec. 7, 2021 issued in PCT International Patent Appln. No. PCT/EP2021/075856.

(Continued)

*Primary Examiner* — Jenna A Watts
(74) *Attorney, Agent, or Firm* — Amster, Rothstein & Ebenstein LLP

(57) ABSTRACT

The present invention relates to a process for producing a more crispy food product based on multi-layered laminated dough such as croissants and the like, to the tools for making such products and the food products prepared according to this process.

16 Claims, 14 Drawing Sheets

(56) References Cited

FOREIGN PATENT DOCUMENTS

| | | |
|---|---|---|
| ES | 1 011 959 U | 6/1990 |
| JP | S50101551 A | 8/1975 |
| JP | S6474944 A | 3/1989 |
| JP | H11289978 A | 10/1999 |
| JP | 2000197444 A | 7/2000 |
| JP | 2017506519 A | 3/2017 |
| JP | 2017063629 A | 4/2017 |
| KR | 20160090500 A | 8/2016 |
| WO | 2015/190268 A1 | 12/2015 |

OTHER PUBLICATIONS

Anonymous: "Pinwheel Pastry Cutter", Aug. 31, 2016, XP055811470, Retrieved from the Internet <URL: https://web.archive.org/web/20160831184109/https://www.pastrychef.com/PINWHEEL-PASTRY-CUTTER_p_2005.html>.

Anonymous: "Pinwheel Cutter | Lakeland", Oct. 16, 2014, XP055811485, Retrieved from the Internet <URL: https://www.lakeland.co.uk/18739/Pinwheel-Cutter>.

Anonymous: "Amazon.com: Ateco Stainless Steel Croissant Roller Cutter: Cookie Cutters: Kitchen & Dining", May 15, 2009, XP055811496, Retrieved from the Internet <URL:https://www.amazon.com/Ateco-Stainless-Croissant-Roller-Cutter/dp/B002A30PPK/>.

Wj Well Join, "Croissant Rolling Cutter", XP55866973, Retrieved from the Internet: URL: https://www.youtube.com/watch?v=wPHTzaY_v1w.

The International Preliminary Report on Patentability date Dec. 19, 2022 issued in PCT International Patent Appln. No. PCT/EP2021/075856, 14 pages.

Japanese Office Action as Issued on Oct. 24, 2023 In Respect to Counterpart Japanese Patent Application No. 2023-518250 and Its English Translation.

Chinese Office Action as Issued on Oct. 13, 2023 in Respect to Counterpart Chinese Patent Application No. 202180064123X and Its English Translation.

Fujiya KK; Oba Shogo: "Sweets, Snacks, and Bread for 365 Days," Feb. 16, 1999, p. 265.

Chinese Office Action as Issued On Feb. 24, 2024 In Respect To Counterpart Chinese Patent Application No. 202180064123X and Its English Translation.

* cited by examiner

A

Raw                    Preproved

B

Raw                    Preproved

A Comparative Examples 1　　1　　2　　2　　3　　3　　4　　4

B

1'　　1'　　2'　　2'　　3'　　3'　　4'　　4'

C

G

H raw  pre-proved  baked raw  pre-proved  baked raw　　　　　　　pre-proved　　　　　　baked raw　　　　　　　pre-proved　　　　　　baked raw    pre-proved    baked

CRISPY PASTRY PRODUCTS

CROSS-REFERENCE TO RELATED APPLICATIONS

This application is a U.S. national stage entry under 35 U.S.C. § 371 of PCT International Patent Application No. PCT/EP2021/075856, filed Sep. 21, 2021, which claims priority to French Patent Application No. 2009525, filed Sep. 21, 2020 and French Patent Application No. 2011046, filed Oct. 28, 2020, the contents of each of which are incorporated herein by reference in their entirety.

TECHNICAL FIELD

The present invention relates to a new type of rolled and/or folded laminated dough product such as croissants and rolls and processes for producing such pastry products.

BACKGROUND

Croissants and related Danish pastry products are produced from multi-layered laminated dough systems that are shaped and rolled into the final product prior to proofing and baking. This shaping process is very important since it will not only influence the final look and shape of the product, but also its mouthfeel such as bite and crispiness.

Croissants and similar laminated dough products are typically prepared from a rectangle, square, rhombus, or triangle-shaped laminated dough piece, which is rolled and/or folded often results a dough product with one or more extremities. For example a croissant is formed from a triangular dough piece, which is rolled from the base towards the top of the triangle, given it its typical shape with two tips (end-points) or extremities. This results in compression of the tips forming the extremities of the dough product. These extremities are proportionally thinner with respect to the rest of the dough product and hence are more dry and less crispy after baking, which is to be avoided.

Some prior art documents have reported on making incisions in the base of a triangular dough shape for making croissants. Examples are ES1011959U, EP0663150A1 and EP1285581A2, all disclosing one or more incisions in the centre of the base of the triangle in order to allow the dough piece to be stretched and reduced further after cutting. The incision is however not made in or at the proximity of the angles formed between the base and the sides of the triangular dough piece forming the croissant and does not result in split extremities of said croissants. The present invention intends to meet the consumer's expectations in increasing the loose layering on the extremities and improving its mouthfeel.

SUMMARY OF THE INVENTION

The present invention encompasses the development of a new method and cutting shape for croissants and similar laminated dough food products (food products based on leavened dough, leavened Danish pastry dough or puff pastry dough products having one or more extremities) which gives the product a new visual aspect with a more loose layering at the tips and a more crispy mouth texture.

Thus, the present invention provides for the following aspects:

Aspect 1. A process for producing food products based on leavened and/or unleavened pastry dough, having split tips (end-points) or split extremities, preferably for producing croissants having split extremities, comprising the steps of:
i) Providing a multilayer laminated dough sheet
ii) Cutting the required shape of the food product, preferably a croissant out of the dough sheet of (i), characterised in that: in one or more corners or sides of the shaped dough sheet, preferably triangularly shaped dough sheet, one or more incision(s) is (are) created; for example:
iia) Cutting the required shape of the food product out of the dough sheet of (i), characterised in that: in one or more corners of the extremities formed by the corners between the base and the side(s) of the shaped dough sheet, an incision is created going from the tip of the corner towards the inside of the shape at an angle A calculated from said base of the shape; or
iib) Cutting the required shape of the food product out of the dough sheet of (i), characterised in that: in one or more sides of, or in the base of the shaped dough sheet, an incision is created going from the sides or base of the shape towards the inside of the shape at an angle B calculated from said side or base of the dough sheet; or combinations of IIa and IIb.

With "extremity" is meant an end-piece of the finally shaped dough product that is proportionally thinner with respect to the rest of the dough product. Typical examples are the two end-points (6) of a croissant as depicted in FIG. 1, but any kind of dough product having one or more thinner endings can be seen as having an extremity.

With "split extremities" is meant that the extremities of the dough piece are in an open configuration, visibly showing two or more parts separated by a cut. It is key to the present invention that said incisions in the extremities must remain visible (through the split extremities) both in the raw or proven rolled or folded product and in the baked end product.

This is in contrast to known methods and processes making an incision in the base of the triangular croissant dough piece for stretching the basis of the dough (i.e. for making longer croissants) and further reducing the thickness of the dough piece after cutting, thereby loosing the visible presence of said incision in either the raw, proven or baked end product.

It is important to note that in the method of the present invention, after cutting the dough shape or piece, the latter is not reduced in thickness further, i.e. it is directly rolled or folded into its final, e.g. croissant or roll, shape substantially without stretching or reducing its thickness.

It's the combination of aspects 1 iia and iib with the rolling with reduced thickness before and no stretching after cutting which allows both visual shape before and after baking and enhanced crustiness of the two end-points after baking.

In a further preferred embodiment, the dough piece is a triangular dough piece and the food product to be formed is a croissant with split extremities, obtained by making incisions in both angles formed by the base and the sides of the triangle or in the base, in close proximity to both angles formed by the base and the sides of the triangle. In close proximity to implies within a distance of the angle that is 7.5% or less, 7% or less, 6.5% or less, 6% or less, 5.5% or less, or 5% or less of the base length of the triangle. For example, said incisions are made within a distance of both angles of about 8 mm or less, about 7 mm or less, or about 6 mm or less from the angle of the base and the sides of the triangle.

Aspect 2. The process according to aspect 1, wherein said food product is selected from the group consisting of: croissants, filled croissants, or chocolate rolls, pastry turnovers, Danish pastry rolls, spirals, or twists and the like.

Aspect 3. The process according to aspect 1 or 2, wherein said dough product is a croissant and said shape is a triangular shape, preferably an isosceles triangle shape. Alternatively, said shape can be a rectangle, a rhombus or a square.

Aspect 4. The process according to any one of aspects 1 to 3, wherein said shape is a triangular shape, having a base length of between 80 and 200 mm, and a height of between 100-300 mm. In case said shape is a rectangle, a rhombus, or a square, the base typically has a length of between 50 and 300 mm and a height of between 300 and 50 mm.

Aspect 5. The process according to any one of aspects 1 to 4, wherein the angle between the base and the sides (legs) of said triangle is between 50 to 80 degrees. When the shape is a rhombus, its angles can be anywhere between 50 to 130 degrees.

In case the shape used is a rectangle or a square, the angles formed are 90 degrees.

Aspect 6. The process according to any one of aspects 1 to 5, wherein said angle A is between 20 and 50 degrees in case a triangular shape is used, or wherein said angle A can be between 20 and 70 degrees when a rectangular shape is used. In case of a rhombus, the angle of the incision A can be anywhere between 0 and 30 degrees with respect to the diagonal connecting said tip angle with its opposite angle; and/or wherein said angle B is between 30 and 90 degrees with respect to the side wherein said incision is made, when a triangle, rectangle, square or rhombus is used.

In one embodiment, said incisions are all of the type 'IIa', i.e. in the angles or corners of the dough shape.

In another embodiment, said incisions are all of the type 'IIb', i.e. in the sides or base of the dough shape, preferably within a distance of the angles of 7.5% or less, 7% or less, 6.5% or less, 6% or less, 5.5% or less, or 5% or less of the length of the base of the triangle, such as for example about 8 mm or less, about 7 mm or less, or about 6 mm or less from said angles between the base and the sides of the triangle. Preferably, when the shape is a triangle, 2 incisions of the IIa or IIb are present, i.e. one in or in close proximity to each of the angles formed by the base and the sides of the triangle.

In yet another embodiment, said incisions are a combination of incisions of types 'IIa' in the angles or corners and 'IIb' in the sides or base of the dough shape.

Aspect 7. The process according to any one of aspects 1 to 6, wherein the length of said incision is between 20 to 50 mm. Alternatively, said incision has a length which is 10-40% of the length of the base of the triangle or rectangle or of the diagonal of the rhombus intersecting the angle of the tip or extremity to be incised.

Aspect 8. The process according to any one of aspects 1 to 7, wherein said incision follows the bisector of the angle formed between base and sides (legs) of the triangle, or between the basis and height of the rectangle.

In case of a rhombus shape, said incision can be in any of the four angles and can be following the bisector of said angles, i.e. one of the diagonals of the rhombus.

Aspect 9. The process according to any one of aspects 1 to 8, wherein said food product is a croissant.

Aspect 10. The process according to any one of aspects 1 to 9, further comprising the step of rolling the cut dough piece from the base to the top of the triangle, thereby forming a croissant shape. In case a rectangular or square shape is used, said dough piece is typically folded or rolled.

Aspect 11. The process according to any one of aspects 1 to 10, further comprising a (pre-)proofing step.

Aspect 12. The process according to any one of aspects 1 to 11, further comprising the step of freezing or deep-freezing (shock-freezing) said shaped laminated dough product at a temperature of between −18° C. and −40° C., preferably for a period of between 2 minutes and 1 hour.

Aspect 13. The process according to anyone of aspects 1 to 12, wherein the final laminated dough product is frozen through a freezing step carried out at a temperature of between −12° C. and −18° C., preferably for a period of between 20 minutes and 24 hours, followed by a deep-freezing step carried out at a temperature of between −18° C. and −40° C., preferably for a period of between 2 minutes and 1 hour, or vice versa.

Aspect 14. The process according to anyone of aspects 1 to 13, additionally encompassing a baking step of the frozen product, preferably in an oven which is a conventional oven or a pulsed air oven, with or without steam.

Aspect 15. The process according to aspect 14, in which said baking step is carried out at a temperature ranging from 140 to 200° C., preferably for a period ranging from 12 to 30 minutes.

Aspect 16. The process according to aspect 14 or 15, wherein prior to the baking step, a step of proofing or pre-proofing or of glazing or egg-washing is performed on the dough product.

Aspect 17. The process according to any one of aspects 1 to 16, characterised in that said process is a (semi-) industrial and continuous process.

Aspect 18. Laminated dough cutting tool suitable for use in a continuous or semi-continuous process for producing croissants, characterised in that: it has a triangular shape and also has one or more inward facing incisors in the angles between the base and the sides (legs) of the triangle, and/or in the sides or base of said triangle; or in that it has a rectangular shape and also has one or more inward facing incisors in the angles or corners and/or sides of the rectangle; or in that it has a rhombus shape and has one or more inward facing incisors in the angles or corners and/or sides of the rhombus.

In a preferred embodiment, said cutting tool is characterised in that it has a triangular shape and has cutting means in the bisector of both angles formed by the base and the sides of the triangle, or has 2 cutting means in the base of the triangle, in close proximity to said angles formed by the base and the sides of the triangle. In close proximity to implies within a distance of the angle that is 7.5% or less, 7% or less, 6.5% or less, 6% or less, 5.5% or less, or 5% or less of the base length of the triangle.

For example, said incisions are made within a distance of both angles of about 8 mm or less, about 7 mm or less, or about 6 mm or less from the angle of the base and the sides of the triangle.

Aspect 19. The use of the laminated dough cutting tool according to aspect 18, for producing a croissant in a continuous or semi-continuous process, preferably in the process according to any one of aspects 1 to 17.

Aspect 20. A food product based on leavened dough, leavened Danish pastry dough products having extremities, preferably a croissant, obtained by the method according to any one of claims 1 to 17, preferably characterised in that said food product has split extremities. Said split extremities are visible prior to and preferably also after baking the product.

Aspect 21. The food product according to aspect 20, characterised in that it has an improved crispiness, and/or flakiness when compared to a food product prepared with a method in which the extremities have not been cut or incised according to the method of any one of claims 1 to 17.

Aspect 22. The food product according to aspect 21, wherein said crispiness, and/or flakiness has been determined by an expert panel.

Aspect 23. The food product according to any one of aspects 20 to 22, characterised in that it has split extremities or tips.

It should be clear to the skilled person that the above technologies can be readily applied to other Viennese and Danish pastry products with extremities, by applying an incision in the tips or sides forming the extremities after final shaping of the dough product.

DETAILED DESCRIPTION

Figure 1:
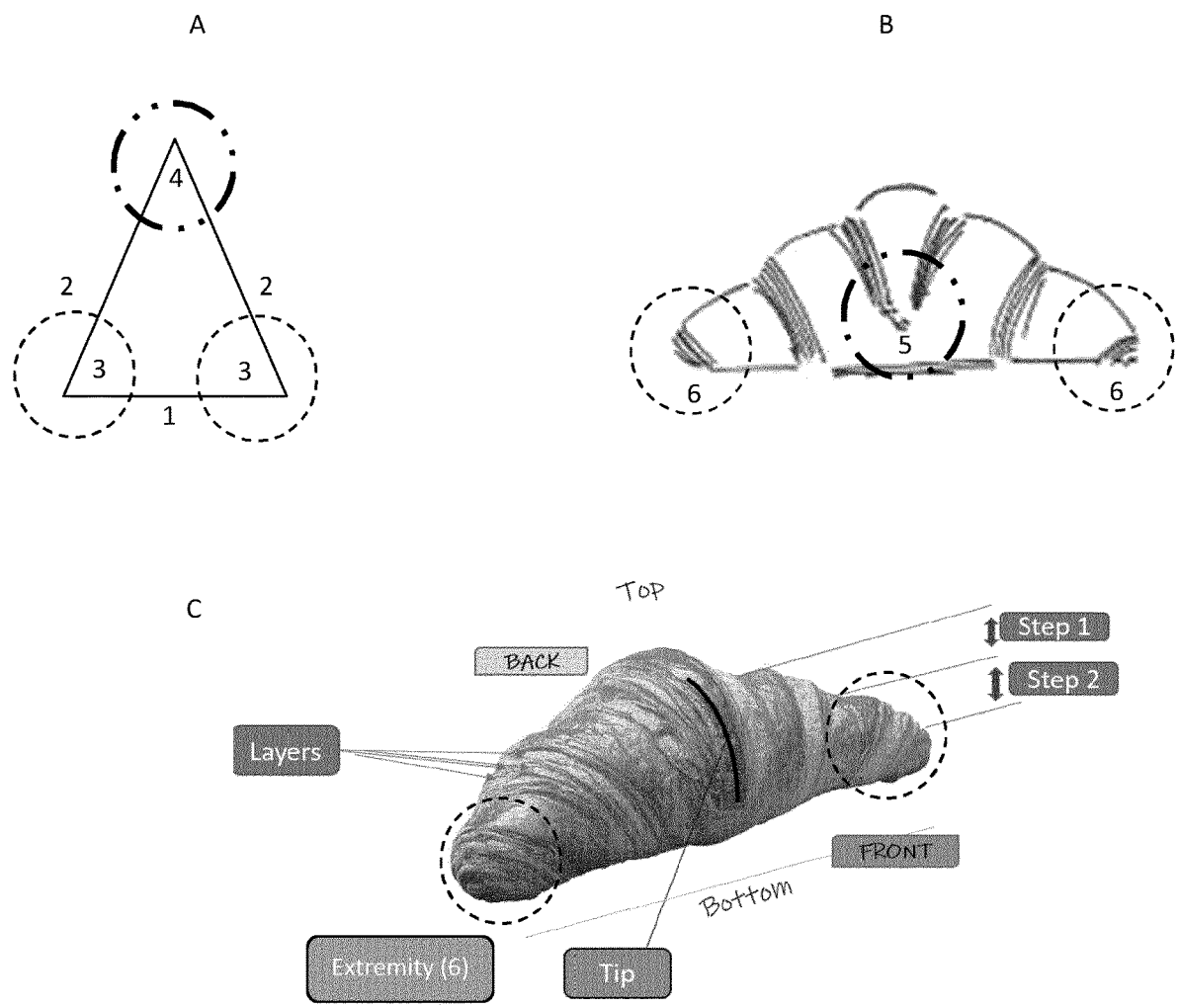
FIG. 1. Schematic representation of the general dough shaping of a croissant. A) a triangular multilayer laminated dough piece having a base (1) and two sides (legs) (2) forming an angle (3) with said base and an angle (4) with each other. B) a croissant after folding and baking, wherein prior to baking the dough piece has been rolled up from base towards the tip (5) formed by angle (4). The two extremities (6) are clearly visible and are the result of the rolling of angles (3) of the dough piece. C) Orientation points of a typical croissant for clarification.
Figure 2A:
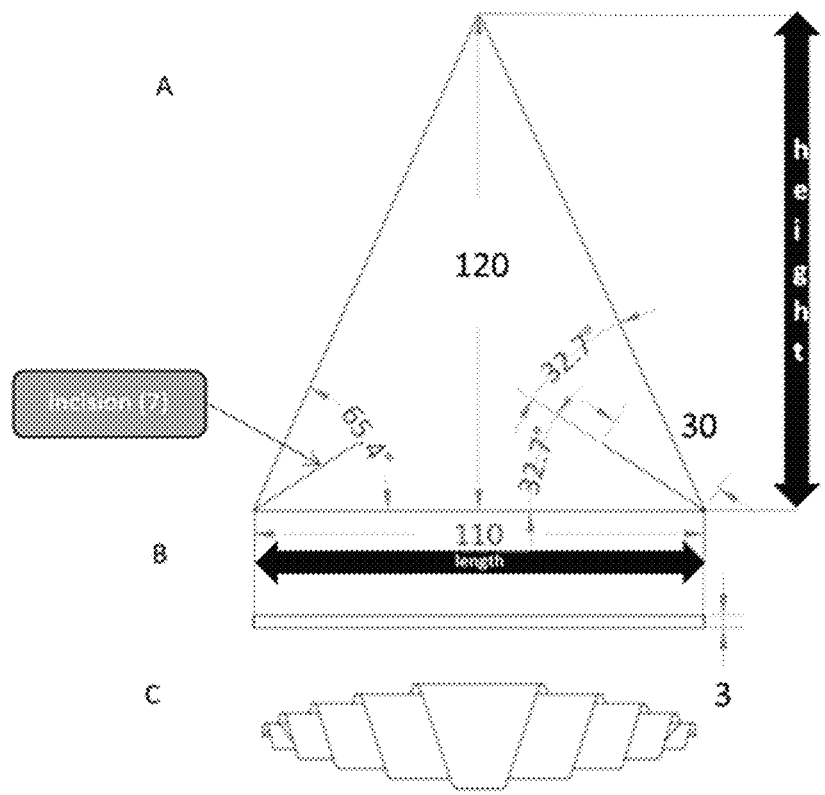
FIG. 2a. A) Exemplary scheme of the cutting means for a croissant formed from a multi-layered laminated dough piece and its resulting dough piece, having a base length of 110 mm and a height of 120 mm (dimensions are exemplary and not to be seen as limiting). The cutting means also has an additional cutting line in the corners (3) formed between the base (1) and the sides (legs) (2) of the triangle. In the example (again not limiting), said incision cutting means are located in the bisector of said angles (3). B) the cross-section view of the multi-layered laminated dough piece. C) final shape of the dough after rolling the dough piece from its base (1) towards the tip (5), prior to (proofing) freezing/(proofing) baking.
Figure 2B:
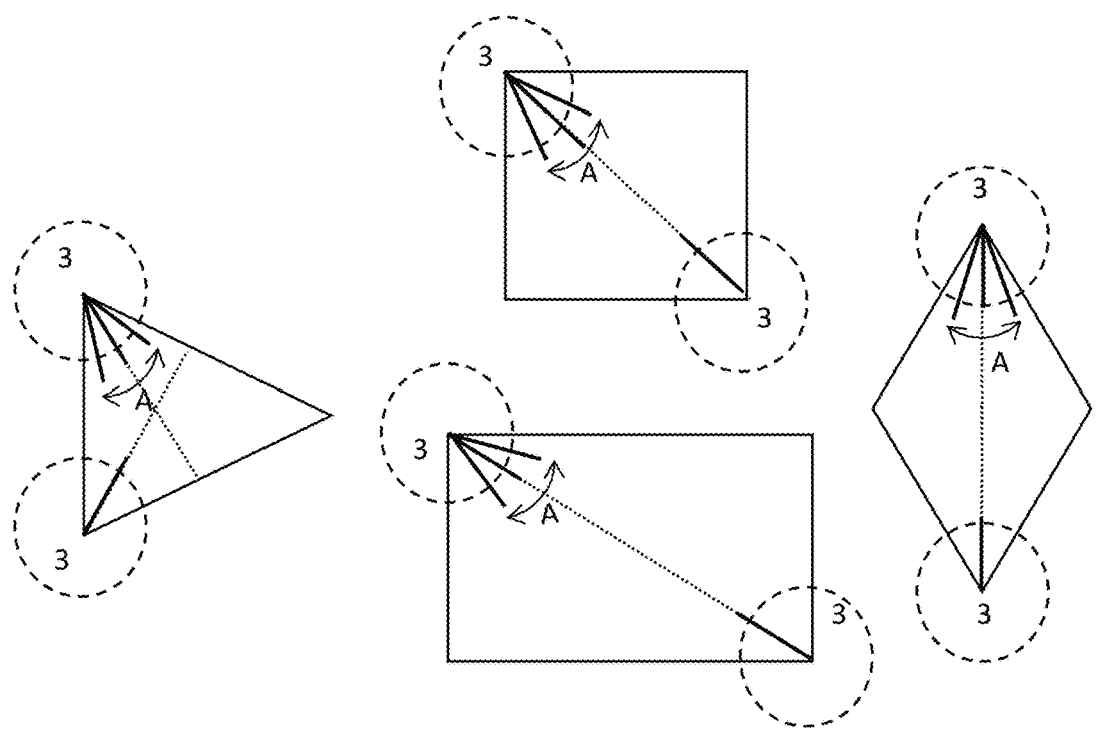
FIG. 2b. Schematic representation of different possible dough shapes and incisions for triangle, rectangle, rhombus and square. The angle of the extremity (3) is indicated for the different shapes. As can be seen for all shapes, the incision can typically be made along the bisector of angle (3). A certain variation in said angle (A) is of course allowed as well, indicated by the double headed arrows.

The present invention will be described with respect to particular embodiments but the invention is only to be seen as limited by the claims. Any reference signs in the claims shall not be construed as limiting the scope. The following terms or definitions are provided solely to aid in the understanding of the invention. Unless specifically defined herein, all terms used herein have the same meaning as they would have to one skilled in the art of the present invention. The definitions provided herein should not be construed to have a scope less than the one understood by a person of ordinary skill in the art.

Unless indicated otherwise, all methods, steps, techniques and manipulations that are not specifically described in detail can be performed and have been performed in a manner known per se, as will be clear to the skilled person. Reference is for example again made to the standard handbooks, to the general background art referred to above and to the further references cited therein.

As used herein, the singular forms 'a', 'an', and 'the' include both singular and plural referents unless the context clearly dictates otherwise. The term "any" when used in relation to aspects, claims or embodiments as used herein refers to any single one (i.e. anyone) as well as to all combinations of said aspects, claims or embodiments referred to.

The terms 'comprising', 'comprises' and 'comprised of' as used herein are synonymous with 'including', 'includes' or 'containing', 'contains', and are inclusive or open-ended and do not exclude additional, non-recited members, elements or method steps. Said terms also encompass the embodiments "consisting essentially of" and "consisting of".

The recitation of numerical ranges by endpoints includes all numbers and fractions subsumed within the respective ranges, as well as the recited endpoints.

The term 'about' as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier 'about' refers is itself also specifically, and preferably, disclosed.

All references cited in the present disclosure are hereby explicitly incorporated by reference.

Typically, a pre-dough composition is prepared by mixing and kneading all ingredients together in a single step. For the purposes of the invention, the term "dough premix" or "pre-dough" composition as used herein encompasses a mixture comprising flour and water and optionally other ingredients such as, but not limited to: sugar, gluten, improver, salt, yeast, sourdough, eggs and dairy ingredients such as milk, milk powder, buttermilk, or whey.

The pre-dough is then sheeted, and a fat layer is enclosed within a bottom and top layer of the pre-dough. Repeated sheeting and folding of this layered paste produces a laminar system with alternating sheets of pre-dough and fat. This is the standard process to obtain pastry products. In an industrial bakery the fat for making pastry dough (i.e. the lamination fat, which can comprise butter, margarine or blends thereof) is received in the shape of blocks (10 to 25 kg blocks). From these blocks, a regular and continuous layer of fat is created by using a so-called fat pump. This fat layer then follows the different sheeting and laminating steps in the process. Lamination fat is a water in oil emulsion.

In preferred embodiment, the dough product is a leavened dough product, i.e. the pre-dough product also comprises a suitable amount of yeast. Such a dough product will, prior to baking also require a leavening step or pre-proving step.

For the purposes of the invention, the term "laminating fat" as used herein encompasses any type of dairy based butter or margarine (animal fat or vegetable oil based) or blends thereof that is suitable for laminating dough. Suitable laminating fats need to have a tough and plastic texture as it is required to be rolled out, stretched and sheeted between the dough layers. This step may be carried out on an automatic system with an extruder by forming a laminate structure comprising superimposed layers of fat and of dough.

The amount of butter or of margarine or blend thereof incorporated into the final dough can be representing between 15% and 40%, such as between 20% and 30% by weight of the total weight of the dough. The layers of fat allow the product to develop, carbon dioxide exerting a pressure between the layers.

The term "improver" encompasses active compounds which assist the development of the dough and shelf-life of the product. Non-limiting examples are: enzymes, emulsifiers or ascorbic acid.

For the purposes of the invention, the term "reduction" as used herein encompasses the reduction of the thickness of the laminated dough sheet, typically done by means of a calibrator, or sheeter. After folding, the laminated dough can easily have a thickness of 4 to 7 cm and in order to be useable in e.g. pastry products, its thickness needs to be reduced to about 5 mm, or even less before shaping. This can be done using a series of calibrators with reduced openings, hence resulting in a series of reductions of the laminated dough in a gentle manner, i.e. without causing the gluten network and/or the fat layers to break or rupture.

For the purposes of the invention, the terms "industrial" or "semi industrial" as used herein encompasses any continuous process not or barely requiring manual intervention, i.e. a system that is fully or almost fully autonomously producing multilayer laminated dough products or sheets. This is in contrast to artisan processes, which require the interaction (manual intervention/adaptations) of a (artisanal) baker in order to complete the production phase of the dough.

For the purposes of the invention, the term "extruder" as used herein encompasses any extrusion means that enables the production of a thin layer or sheet of either dough, fat or butter. It will typically comprise a thin opening or "mouth" through which the dough, fat or butter is forced out of the pump onto the conveyor belt or onto another layer. For example, a combination of three extruders can be used to create a sandwich of fat-dough-fat sheets according to the invention. In some embodiments, said extruder comprises a feeding means for the dough premix; one or more vertical and/or horizontal screws and an extrusion means.

For the purposes of the invention, the terms "fat pump" or "butter pump" as used herein encompasses any type of pump capable of sufficiently malleating the fat or butter so as to make it plastic enough for thin sheeting by means of an extruder.

For the purposes of the invention, the term "flouring device" or flour "duster" as used herein encompasses any means that can dust or bring a thin layer of flour on and/or under the laminating dough sheet in order to reduce its stickiness during continuous industrial or semi-industrial production.

For the purposes of the invention, the term "conveyor belt" as used herein in relation to the production line for producing laminated dough encompasses any conveying system that is able to transfer the sheet of laminated dough over the production line. It can typically comprise multiple separate elements connecting the other means and devices on the line such as extruders, calibrators, laminators or folders, etc. and enabling the transfer of the sheet to said subsequent elements.

For the purposes of the invention, the term "calibrator" as used herein in relation to the production line for producing laminated dough encompasses any reduction means or sheeting means that uses a single roller to reduce the thickness of the dough. This is not to be confused with a multi-roller reduction means.

For the purposes of the invention, the term "folding means" as used herein in relation to the laminating production line refers to a device that can fold and stack the laminated dough sheet one or multiple times. There are different types of folding means, sometimes also referred to as "laminators", that result in asymmetrical lamination or symmetrical lamination. Lamination can be done in different ways. For example, through lapping, which is done by running the dough sheet vertically between a guiding system that moves back and forth. In cutting and stacking, a guillotine cuts the dough sheet into regular rectangular sheets which are then stacked on top of each other. Alternatively, laminating can be done through horizontal laminating, whereby the conveyor belt with the dough sheet moves back and forth above the next conveying belt, thereby stacking the layers.

This laminating step may be progressive laminating, the dough passing through one or more calibrators, the space made between the conveying belt and the calibrator decreasing towards the following calibrator. Preferably, at the end of the laminating step, the thickness of the dough is between 15 and 2 mm, and preferably between 10 and 2 mm.

The process of the invention may comprise a step of rolling, shaping, and/or cutting up the dough. For example, for the preparation of a croissant, the cutting up step is carried out in the shape of a triangle, said croissant then being rolled up on itself to give it the desired shape, sheets for e.g. galettes can be cut out as well.

Cutting up the dough for the preparation of e.g. a chocolate roll or a fruit or pudding filled roll or pastry can also be envisaged of course.

In general, the present invention encompasses a cutting tool and methods of using such in the production of laminated dough products which enables the making of an incision in the tips of the dough product that will form the extremity of the final dough product after rolling, shaping or folding, or in the sides or base of said dough product. In the example of a croissant, the cutting means will have an additional incision making means in the angles formed by the base and the sides (legs) of the triangle or in the base of said triangle in proximity of said angles. Such an incision making means preferably needs to be sufficiently sharp such as to provide a clean cut, such as not to damage the remaining gluten structure and layering of the dough piece. Standard cutting means for use in continuous or semi-continuous production lines of croissants can be commercially obtained. In one embodiment, said incision tool can effectively cut away a small piece (a wedge) of dough instead of just making a sharp incision (cf. FIG. 7A). The width of the small wedge created as such can be anywhere from 0 to 10 mm, such as from 1 to 7 mm, from 1 to 5 mm, from 1 to 4 mm, from 1 to 3 mm or from 1 to 2 mm.

When said incision is made in the base of e.g. a triangular shaped dough piece, said incisions are preferably made within a distance of the angles of 7.5% or less, 7% or less, 6.5% or less, 6% or less, 5.5% or less, or 5% or less of the length of the base of the triangle, such as for example about 8 mm or less, about 7 mm or less, or about 6 mm or less from said angles between the base and the sides of the triangle. Preferably, when the shape is a triangle, 2 incisions of the IIa or IIb are present, i.e. one in or in close proximity to each of the angles formed by the base and the sides of the triangle.

The angle between the incision and the base of e.g. a triangular shaped dough piece is typically substantially following the bisector of the angle formed by the base and sides of the triangle or is substantially parallel thereto. Preferably, the imaginary line through said incision is set at an angle of 10 degrees or less, preferably 5 degrees or less with respect to said bisector. Alternatively, the angle between the incision and the base of e.g. a triangular shaped dough piece is set at between 20 to 50 degrees.

Figure 3:
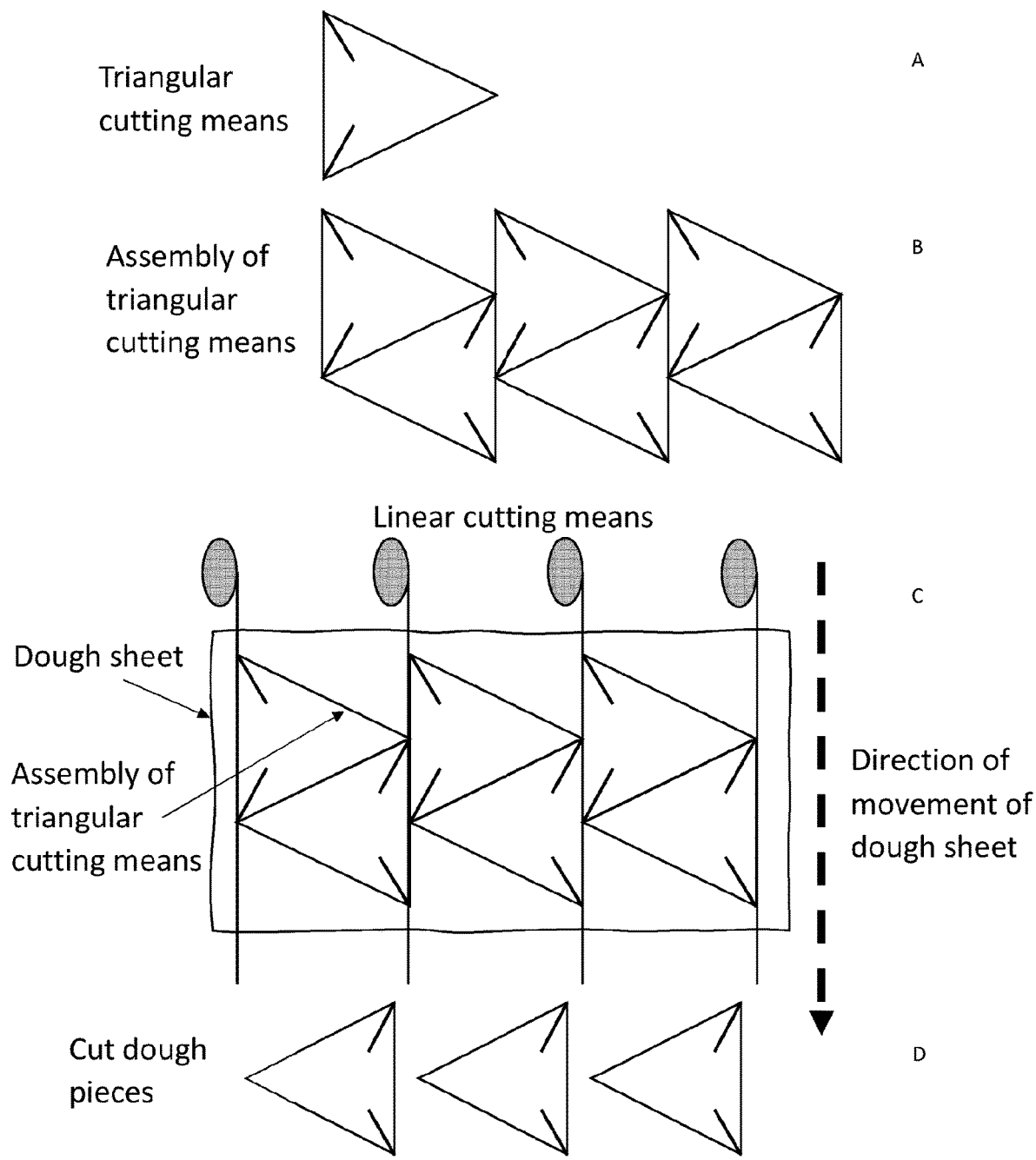
FIG. 3. A) basic cutting means having a triangular shape with two incisions in the bisector of the angles formed by the base and the sides (legs) of the triangle. B) shows a non-limiting example of a potential organisation of multiple cutting means of A), resulting in the possibility to cutting multiple (3 in this non-limiting example) croissant shapes that can then subsequently be rolled into their final shape. C) an exemplary set up of the cutting installation, showing a dough sheet and its direction of movement through the line, linear cutting means (4 in this non-limiting example) and the organisation of multiple cutting means as shown in B). D) resulting dough pieces after cutting and prior to rolling into their final shape from basis to top of the triangle. The same can of course be applied to another, i.e. non-triangular shaped dough piece.

An example of a cutting means for continuous production of croissants is shown in FIG. 3. Panel A) shows the basic cutting element having a triangular shape with two incisions in the bisector of the angles formed by the base and the sides (legs) of the triangle. Panel B) shows a potential organisation of multiple such cutting means, resulting in the possibility to cut (in this non-limiting example) 3 croissant shapes that can then subsequently be rolled into their final shape. It is obvious that such an arrangement is only one example and can be adapted according to the production line used. In panel C) of FIG. 3, a complete exemplary set up is shown, including a dough sheet and its direction of movement through the line, linear cutting means (4 in this non-limiting example) and the organisation of multiple cutting means as shown in panel B). Panel D) then shows the resulting dough pieces after cutting and prior to rolling into their final shape. The same can of course be applied to another, i.e. non-triangular shaped dough piece. The orientation of said cutting means can of course be adapted according to the production line.

The shape of the dough can be anything, but is preferably selected from a triangular, rhombus, rectangular or square shape. Said shapes include also slightly differing shapes and do not have to be perfect geometrical shapes since the dough is a rather malleable substance. The tips of the shapes can e.g. be rounded or cut to avoid pointed tips. Differences in shape can be for example a triangle, rhombus, square or rectangle with slightly rounded or extended corners or angles.

Figure 9:
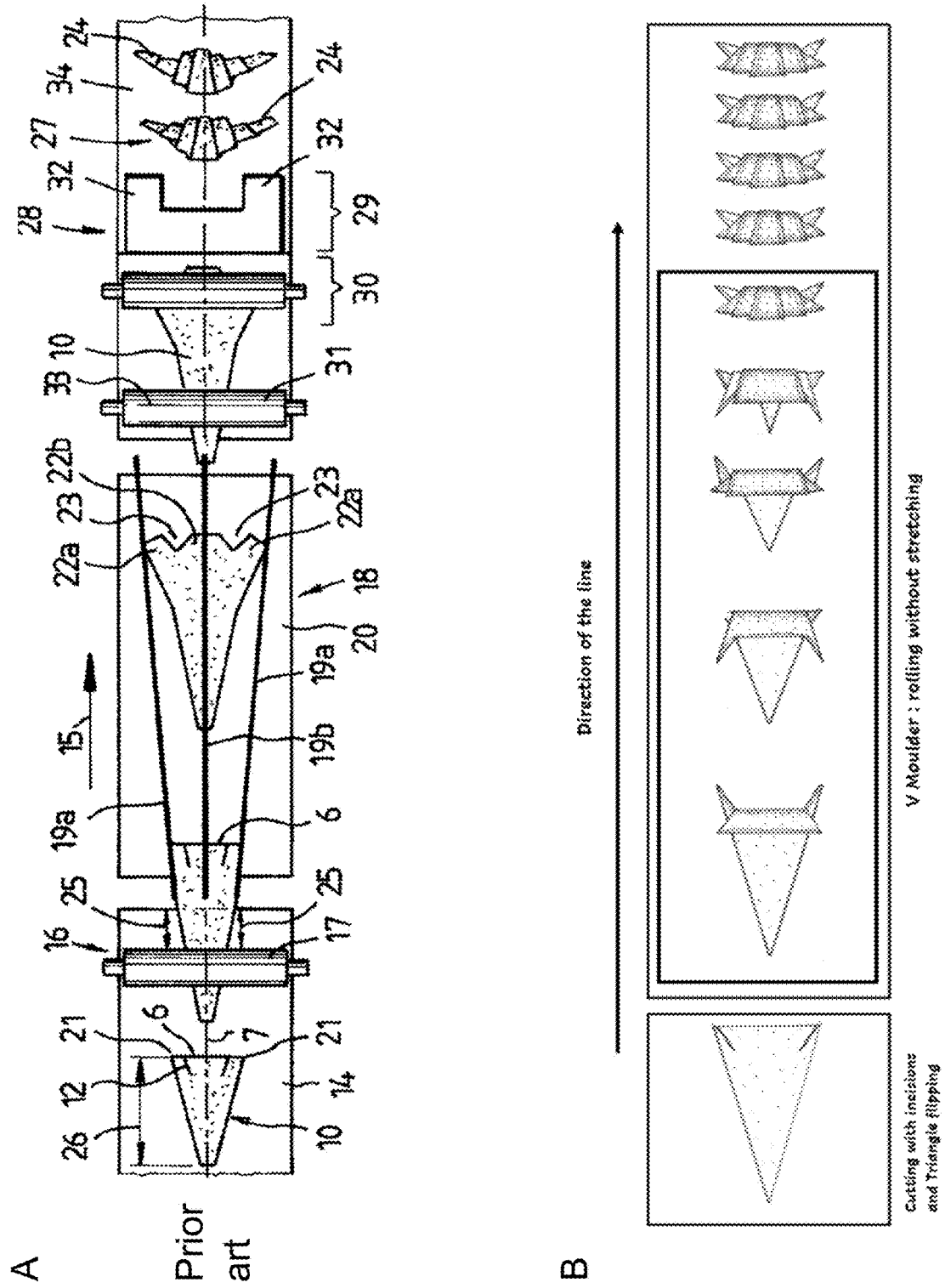
FIG. 9 Comparison of the Present Invention to Prior Art Technology Using Incisions in the Middle of the Base of a Triangular Dough Piece for Making Croissants Panel A represents FIG. 3 of prior art document EP1285581A2 and shows that the dough piece is stretched after the cutting has taken place. Panel B represents the corresponding step of the process of making croissants according to an embodiment of the present invention. As can be seen, in contrast to the process of EP1285581A2, the dough piece is not further stretched or reduced in thickness, but is immediately folded or rolled into its final croissant shape.

Important to note is that after cutting of the dough piece, the latter is not extended (stretched) or reduced in thickness but is simply rolled or folded into its final shape as is. This is in clear contrast to prior art documents that have been implying the use of incisions in the base of the triangle for making croissants in order to enable stretching of the dough piece through further reduction. In the prior art croissants, the incisions do not result in split extremities but rather reside at the bottom of the folded or rolled croissant and are not visible in the end product (either raw, proofed or baked). Said difference is also demonstrated in FIG. 9 comparing both processes.

The process of the invention may comprise a (pre-) proofing step wherein said shaped products can be proofed at a temperature ranging between 15° C. and 35° C., preferably between 25° C. and 30° C.; proofed at an adequate relative humidity ranging between 60% and 90%, preferably between 65% and 80%; and proofed for an adequate time ranging between 30 min and 3 hours, preferably between 1.5 hours and 2.5 hours.

During the optional step of freezing and/or deep-freezing the raw dough product, the temperature is preferably between −12 and −40° C., for a period ranging from 30 minutes to 1 hour. Said dough product can be frozen in its cut or shaped form or as a sheet. Said step is carried out, for example, in a freezing or deep-freezing tower. This step makes it possible to store the dough product for periods of between several hours and several months, and also to maintain the shape of the dough product.

Advantageously, the freezing and/or deep-freezing step in continuous production may comprise:
either a freezing step carried out at a temperature of between −12° C. and −30° C., preferably for a period of between 20 minutes and 24 hours, or
a deep-freezing (shock-freezing) step carried out at a temperature of between −18° C. and −40° C., preferably for a period of between 2 minutes and 1 hour, In deep-freezing, the core of the product achieves a temperature of −18° C., or
a freezing step carried out at a temperature of between −12° C. and −30° C., preferably for a period of between 20 minutes and 24 hours, followed by a deep-freezing step carried out at a temperature of between −18° C. and −40° C., preferably for a period of between 2, 3, 4, or 5 minutes and 1 hour, or conversely a deep-freezing step carried out at a temperature of between −18° C. and −40° C., preferably for a period of between 2, 3, 4, or 5 minutes and 1 hour, followed by a freezing step carried out at a temperature of between −12° C. and −30° C., preferably for a period of between 20 minutes and 24 hours.

The process of the invention may also comprise a glazing step, preferably carried out with eggs and or eggs with other ingredients. This glazing may be carried out before or after the freezing and/or deep-freezing step.

In an additional step, preferably in an ulterior phase, the raw, (pre-)proved, or frozen or deep-frozen food product can be baked in an oven. The oven used may be a conventional oven or a pulsed air oven, with or without steam. According to one embodiment, the baking step is carried out at a temperature ranging from 140 to 200° C., preferably for a period ranging from 10 to 30 minutes. After the baking, the baked foods thus prepared are ready to be consumed.

Another object of the invention relates to raw, or frozen or deep-frozen Danish or Viennese pastries based on leavened or unleavened pastry dough, produced according to the process of the invention. Specific examples of end products are croissants, chocolate rolls or chocolate-, pudding-, cream-, fruit-, or jam-filled croissants or pastry products, pastry turnovers, Danish pastry rolls, spirals, or twists and the like.

Another object of the invention relates to baked foods based on pastry dough, produced according to the process of the invention. Specific examples of end products are croissants, chocolate rolls or chocolate-, pudding-, cream-, fruit-, or jam-filled croissants or pastry products, pastry turnovers, Danish pastry rolls, spirals, or twists and the like.

The invention will now be further exemplified in more detail in a non-limiting manner in the examples section.

EXAMPLES

Example 1. A Process According to the Invention for Producing Crispy Croissants

Pre-Dough Preparation
The recipe for the croissant doughs shown in FIGS. 4 and 5 was as follows:

|  | Typical recipe given on 100 flour |
| --- | --- |
| Flour | 100 |
| Water | 50 |
| Sugar | 15 |
| Yeast | 7 |
| Salt | 2.2 |
| Improver | 2 |
| Laminating fat | 6.25 |
| TOTAL PREDOUGH | 182.45 |

The dough was produced by kneading
Laminating Process
The pre-dough is then sheeted, and a fat layer is enclosed within a bottom and top layer of the pre-dough (24% of fat on end product). Repeated sheeting and folding of this layered paste produces a laminar system with alternating sheets of pre-dough and fat.

Cutting, Shaping, and/or Freezing
The laminated dough sheets were industrially (continuous process) cut in triangular pieces and rolled as from the basis of the triangle to form a croissant shaped dough product. In case of the control dough products, the triangular dough pieces were not cut in their extremities, while in case of the products according to the invention were.

These products can at this time be stored or frozen if needed or can be directly baked.

The dough product is, prior to baking also subjected to a leavening or pre-proofing step.

In this experiment, croissants were frozen, proofed for about 2 hours at 28° C. and a RH of 75% and then baked. Baking was done at a temperature ranging of about 180° C. for a period of 13 minutes.

Figure 4:
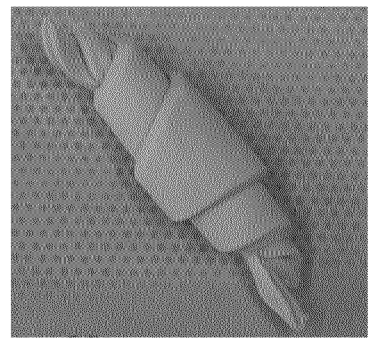
FIG. 4. Photographs of exemplary raw or pre-proved croissants (i.e. prior to baking) prepared according to the invention. The opened tips (5) are clearly visible in the croissants according to the invention (panel A), while being absent in the standard croissants (Panel B).
Figure 4:
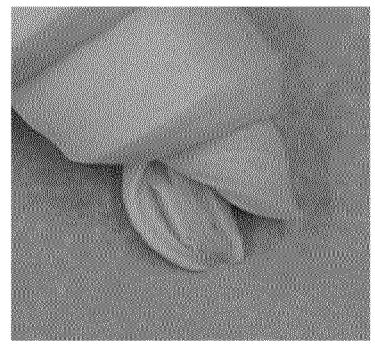
Figure 4:
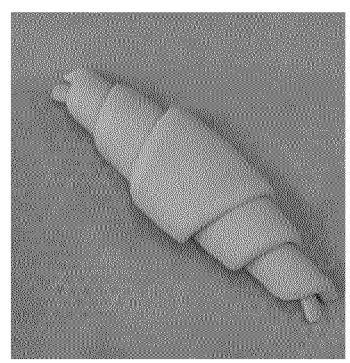
Figure 4:
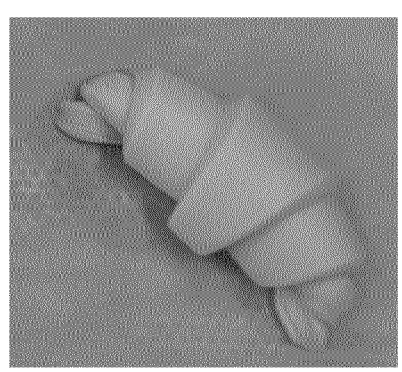
Figure 4:
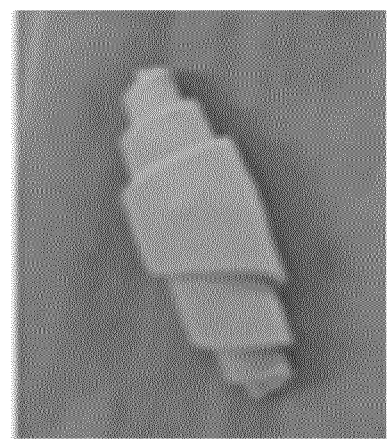
Figure 4:
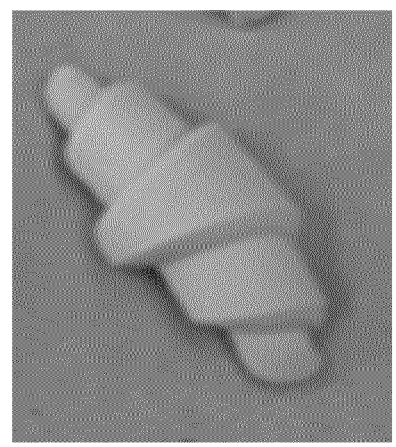
Figure 5:
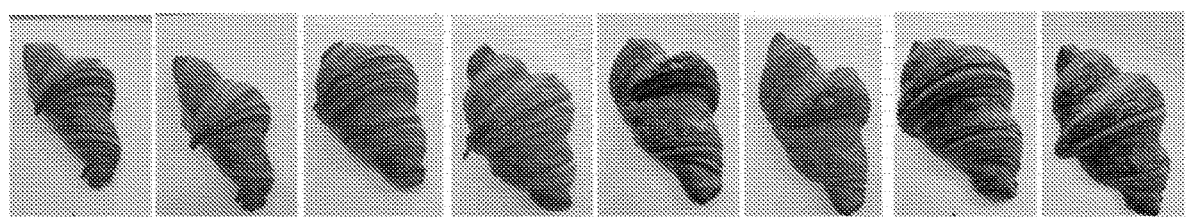
FIG. 5. Photographs of exemplary baked croissants prepared according to the invention (Panel B) as compared to croissants prepared from the same dough compositions using the standard procedure, i.e. without the incision in the tips of the triangle (Panel A). equal numbers (e.g. 1 and 1') represent croissants having the same dough composition and only differ in the presence (1') or absence (1) of the incision in the tip prior to proofing and baking. The looser structure of the tips of the croissants after baking is clearly visible for the ones having the incision. Panel C shows a close-up of a baked croissant according to the invention in which the split tips are clearly visible.
Figure 5:
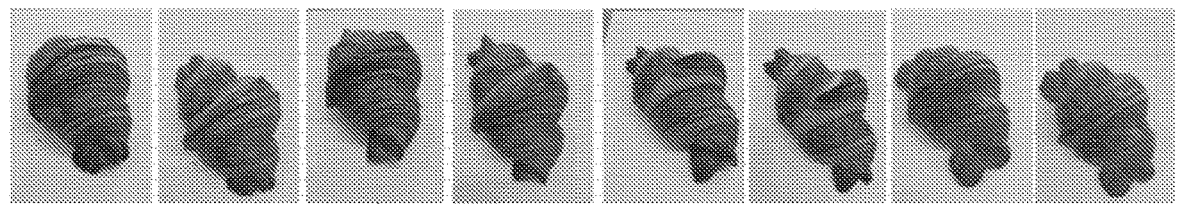
Figure 5:
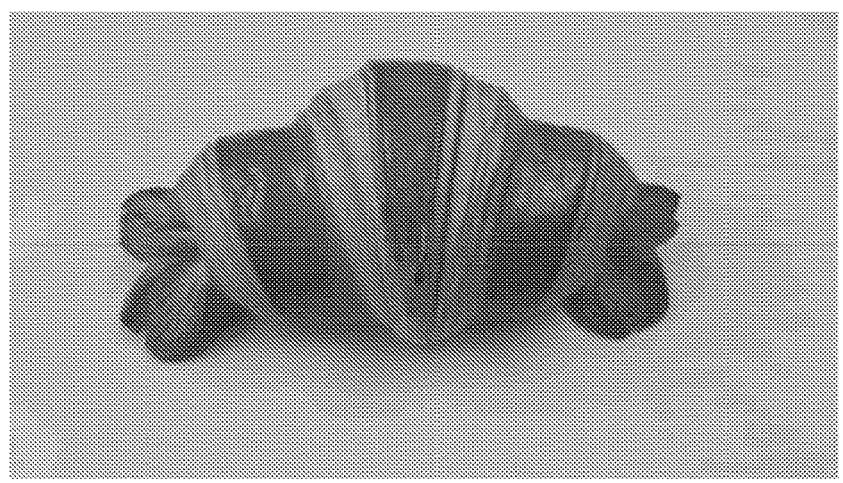

Results
In FIG. 4, the effect of making the additional incisions in the angles formed by the base and sides (legs) of the triangular dough piece is clear at the extremities (6), showing an open layered end. After baking (cf. FIG. 5) this results in a clear more loosened extremity with improved mouthfeel and increased crispiness as shown also in the panel experiment below.

Figure 7:
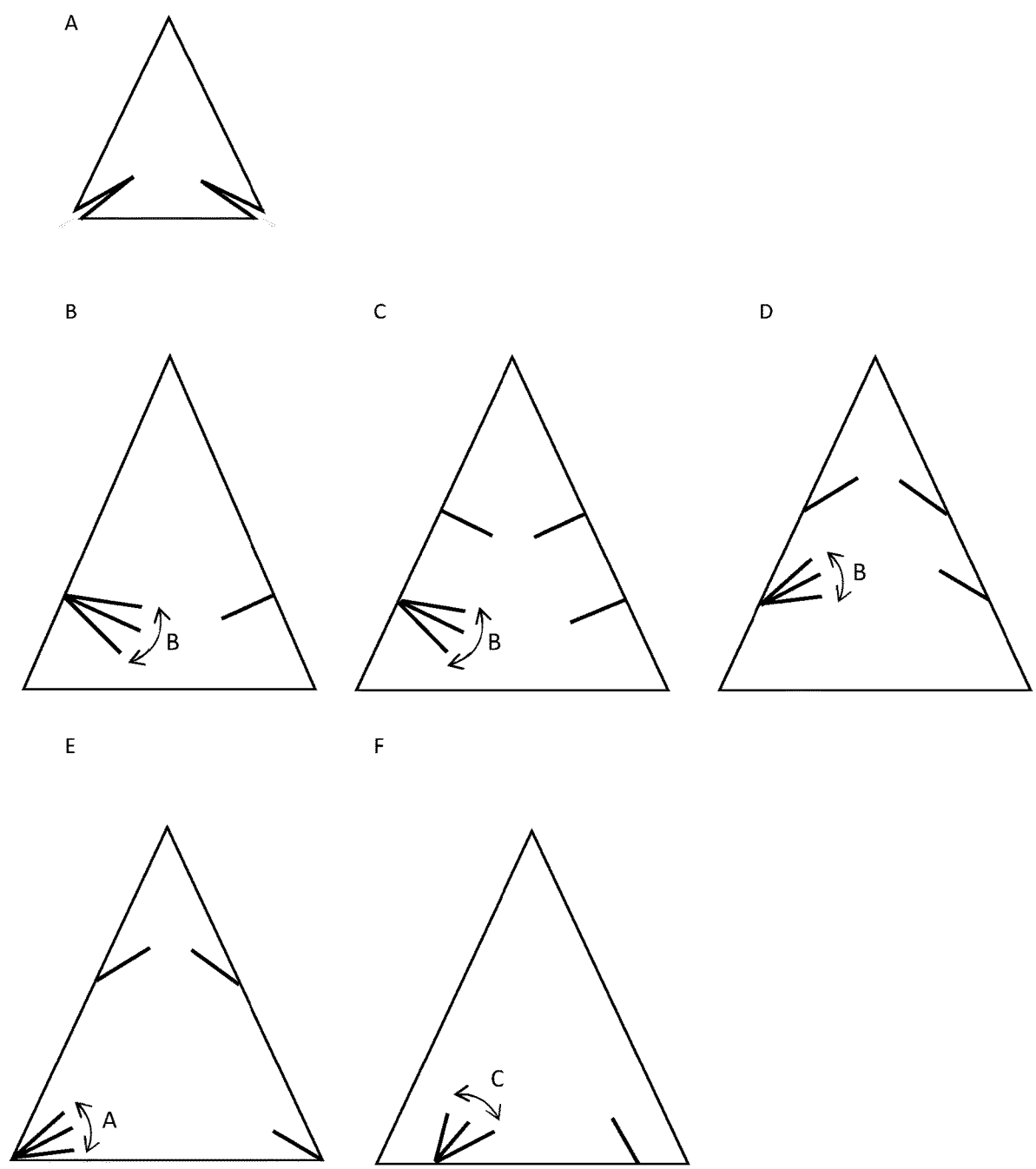
FIG. 7 Different alternatives of incisions of types 'IIa' and 'IIb' discussed herein. A) incision according to type IIa in the angles or corners of the triangle formed between base and sides, but showing a wedge cut out of the dough piece by the incision tool. Said wedge can be applied to all embodiments covered herein; B), C) and D) one or more incisions according to type IIb in each of the sides of the triangle; E) combination of incisions in the angles or corners (type IIa) and in the sides (types IIb) in a triangular dough shape; F) incisions in the base (types IIb) of a triangular dough shape; G) non-limiting exemplary incisions in a rectangular dough piece; H) non-limiting exemplary incisions in a rhombus dough piece.
Figure 7:
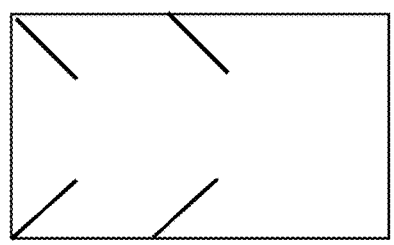
Figure 7:
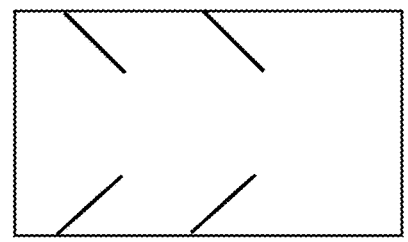
Figure 7:
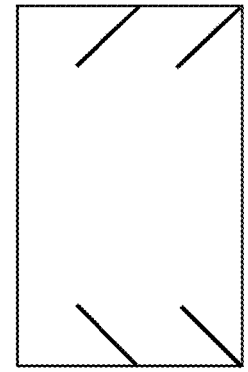
Figure 7:
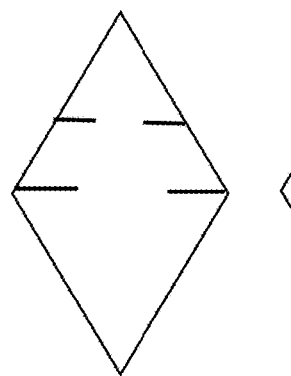
Figure 7:
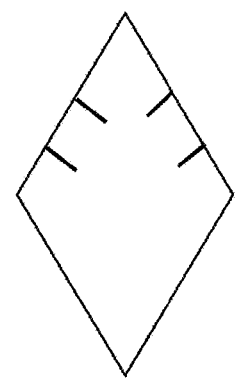
Figure 7:
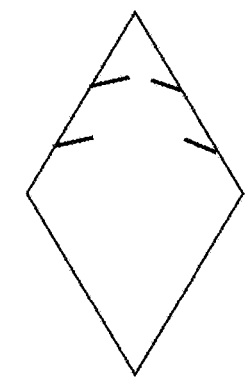
Figure 7:
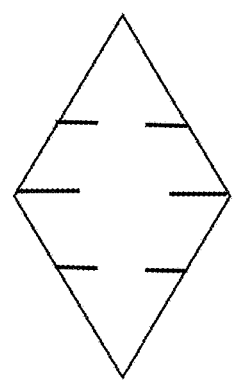
Figure 7:
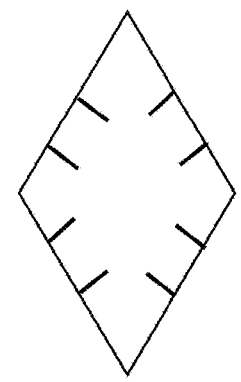
Figure 7:
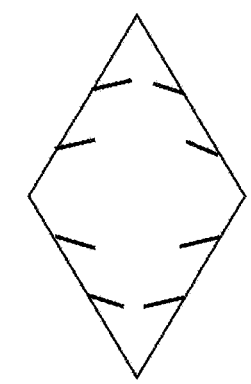
Figure 8A:
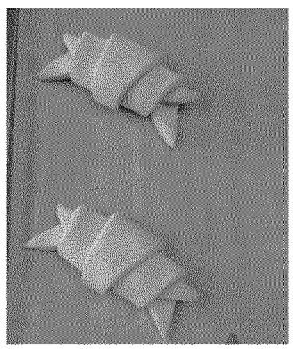
FIG. 8 Results of different alternative forms of FIG. 7, raw, pre-proven and baked: A) Triangular dough form with a single incision in each of the angles or corners of the base formed with the sides (type IIa); B) Triangular dough form with a single incision in each of the sides (type IIb) of the triangle; C) Triangular dough form with two parallel incisions in each of the sides (type IIb) of the triangle; D) Triangular dough form with a combination of an incision in each angle or corner of the base formed with the sides (type IIa) and a parallel incision in each side (type IIb) of the triangle; E) same as in A) but with a small wedge being cut out of the dough piece.
Figure 8A:
Figure 8A:
Figure 8B:
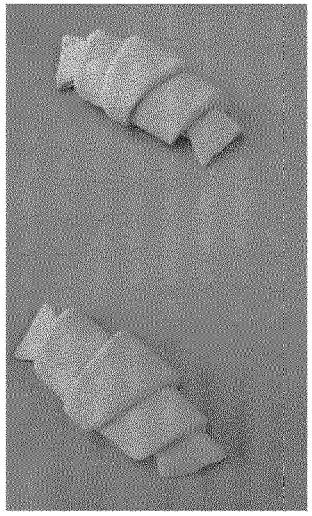
Figure 8B:
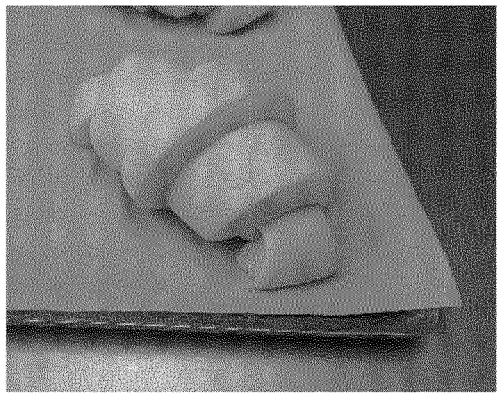
Figure 8B:
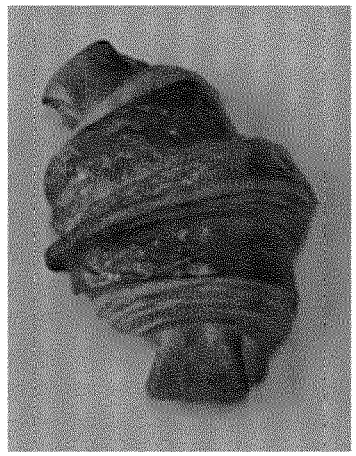
Figure 8C:
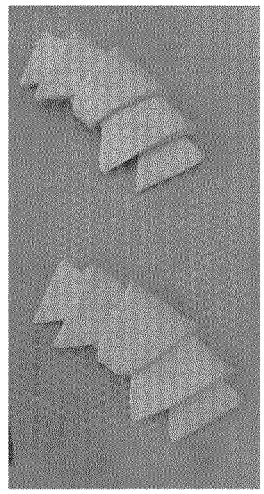
Figure 8C:
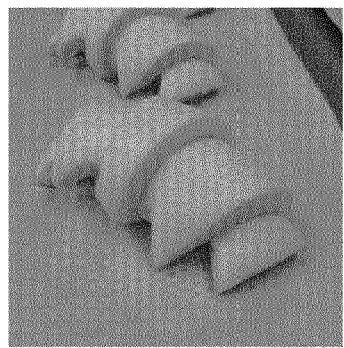
Figure 8C:
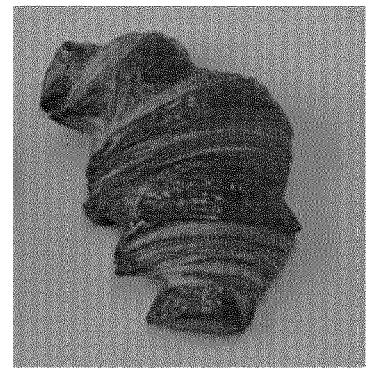
Figure 8D:
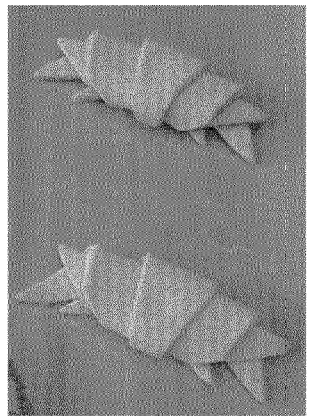
Figure 8D:
Figure 8D:
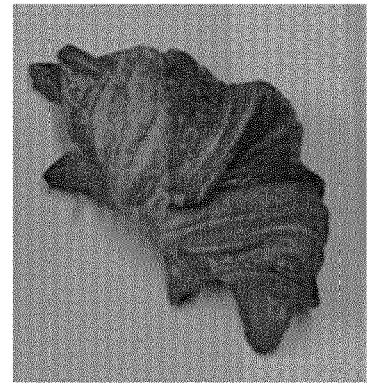
Figure 8E:
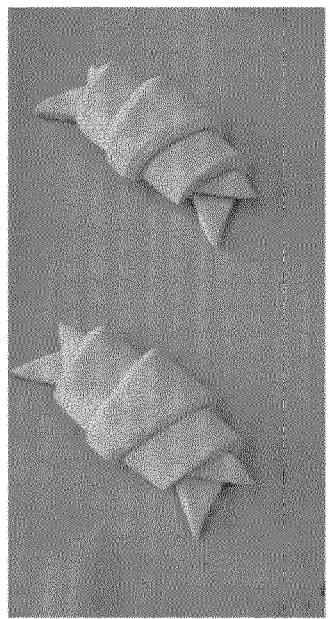
Figure 8E:
Figure 8E:
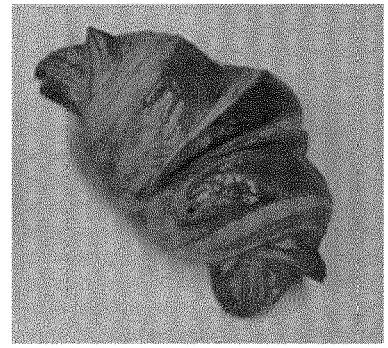

In FIG. 8, examples of alternative embodiments are shown, wherein incisions have been made in the sides and/or base of the dough shape rather than in the corners forming the tips of the croissants (cf. scheme of the incisions in FIG. 7).

FIG. 8 shows raw, pre-proven and baked croissants formed of:
- A) Triangular dough form with a single incision in each of the corners of the base formed with the sides (type IIa);
- B) Triangular dough form with a single incision in each of the sides (type IIb) of the triangle;
- C) Triangular dough form with two parallel incisions in each of the sides (type IIb) of the triangle;
- D) Triangular dough form with a combination of an incision in each corner of the base formed with the sides (type IIa) and a parallel incision in each side (type IIb) of the triangle; and
- E) same as in A) but with a small wedge being cut out of the dough piece.

Also, these embodiments show open layered parts of the croissants which, after baking result in local more loosened crust areas with improved mouthfeel and increased crispiness.

Figure 6:
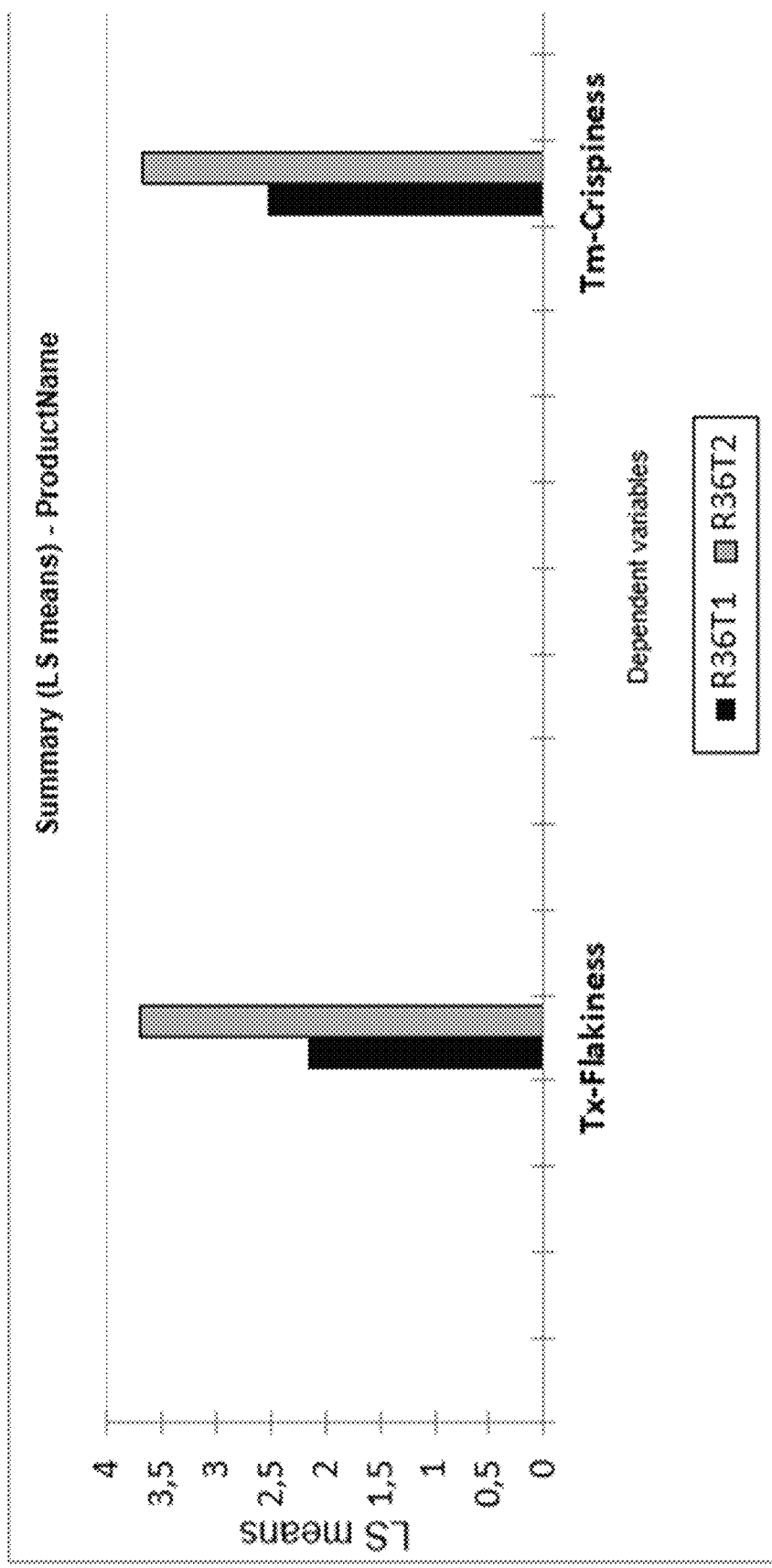
FIG. 6. Results of expert tasting panel regarding crispiness and flakiness of croissants according to the invention (R36T2) and reference croissants (R36T1). From the panel test it is clear that a significant improvement is reached for the croissants made according to the invention in terms of crispiness and flakiness (confidentiality interval of 95%).

A trained panel of 9 experts was requested to perform a descriptive assessment (no preference) of the crispiness of control and test croissants prepared according to Example 1. The results were combined into FIG. 6. From the panel test, it is clear that a significant improvement is reached over standard croissants (R36T1) for the croissants made according to the invention (R36T2) in terms of crispiness, and/or flakiness (confidentiality interval of 95%).

Example 2. Comparison of Croissants Made According to the Present Invention and Croissants Using Prior Art Technology with Incisions in the Middle of the Base of a Triangular Dough Piece for Making Croissants In other to provide evidence that the position of the incision in the base of the triangle does have an influence on the end product formed, croissants were prepared in accordance with Example 1 above, but with the incision made at different positions alongside the base of the triangle.

| Experiment | Position of incision versus bisector of the angle (in mm (in % of base length)) |
| --- | --- |
| T: reference, no incision made | |
| T0: in bisector | 0 (0%) |
| T1: close to bisector | 6 (5%) |
| T2: in base (prior art) | 10.5 (10%) |
| T3: in base (prior art) | 15.8 (15%) |
| T4: in base (prior art) | 21 (20%) |

Figure 10:
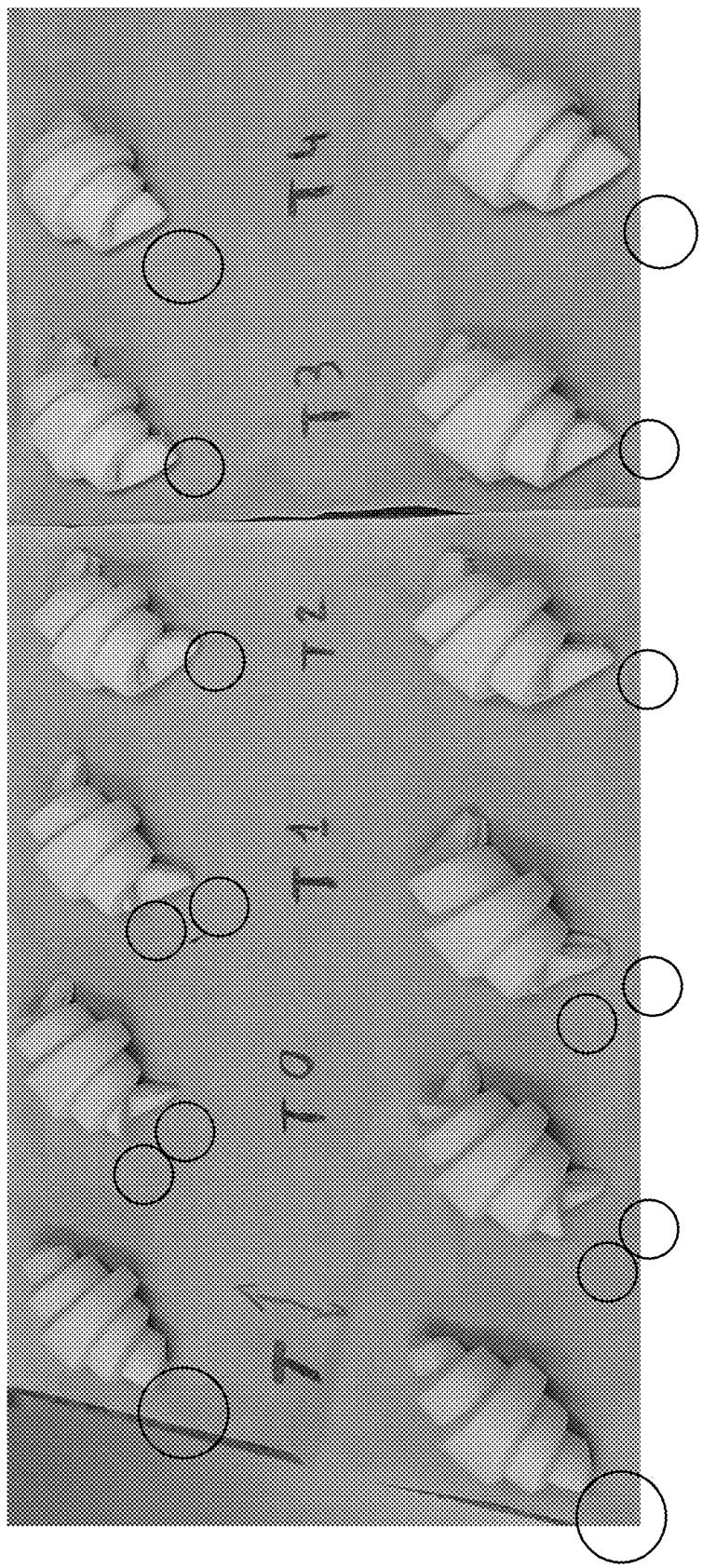
FIG. 10 Comparison of Proofed Croissants Made According to the Present Invention and Croissants Using Prior Art Technology with Incisions in the Middle of the Base of a Triangular Dough Piece for Making Croissants (T) control without incisions made; (T0) incision made in the bisector of the angles; (T1) incision made at 6 mm from the bisector of the angles; (T2 to T4): incision made respectively made 10.5 mm, 15.8 mm, and 21 mm from bisector of the angles. TO and T1 are embodiments according to the invention, T2 to T4 (and T) are prior art embodiments. It is clear from the figure that TO and T1 croissants have split extremities (see encircled tips), while T2 to T4 (and T) do not have split extremities since the incision is too far away from the angle.
Figure 11:
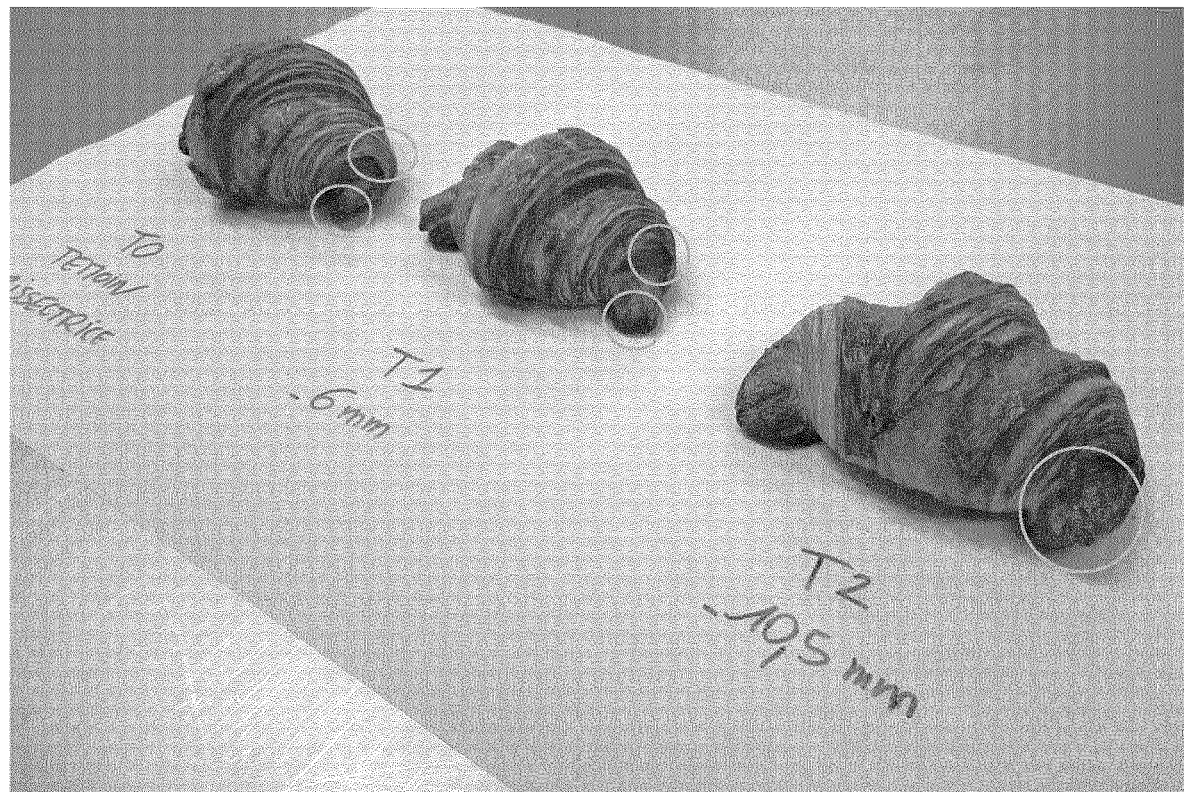
FIG. 11 Comparison of Baked Croissants Made According to the Present Invention and Croissants Using Prior Art Technology with Incisions in the Middle of the Base of a Triangular Dough Piece for Making Croissants (T0) incision made in the bisector of the angles; (T1) incision made at 6 mm from the bisector of the angles; (T2 to T4): incision made respectively made 10.5 mm, 15.8 mm, and 21 mm from bisector of the angles. T0 and T1 are embodiments according to the invention, T2 to T4 (and T) are prior art embodiments. It is clear from the figure that T0 and T1 croissants have split extremities (see encircled tips), while T2 to T4 (and T) do not have split extremities since the incision is too far away from the angle.
Figure 11:
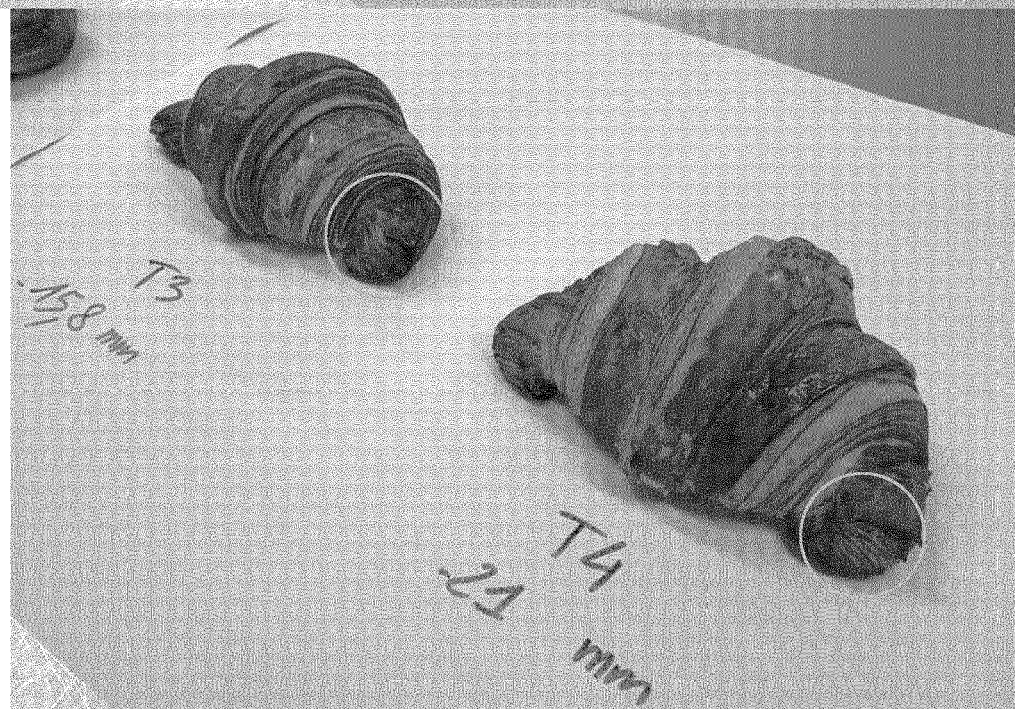

The results on both the proven and baked products show the importance to be close to the two bisector (cf. FIGS. 10 and 11 for proofed versus baked croissants):
- For T0 and T1: open ended (split) extremities
- For T, and T2 to T4: NO open ended extremities. Visual aspect of the extremities more square.

From this it is clear that the effect of having open or split extremities of the croissants in order to have an improved crispiness, and/or flakiness cannot be achieved by the methods and tools disclosed in prior art documents making an incision in the middle of the base of the triangular dough piece. In fact, a new cutting tool had to be developed in order to perform the cutting as per the invention.

The invention claimed is:

1. A process for producing croissants having split extremities, comprising the steps of:
    i) Providing a multilayer laminated dough sheet,
    ii) Cutting a required shape of the croissant out of the dough sheet of (i), to obtain a resulting dough piece having the shape of a triangle, characterised in that:
        a) in each of the corners formed by the angles between the base and the sides of the triangle shaped dough piece, an incision is created going from the tip of the corner towards the inside of the dough piece at an angle A calculated from said base of the dough piece; or
        b) in the base of said triangle shaped dough piece, an incision is created in the proximity of each corner formed by the base and the sides of the triangle going from the base of the dough piece towards the inside of the dough piece at an angle A calculated from said base of the dough piece, wherein said incision in the base of the triangle is within a distance of the angles formed by the base and the sides of the triangle of 7.5% or less of the length of the base of the triangle;
    or a combination of iia and iib.

2. The process according to claim 1, wherein the triangle is an isosceles triangle.

3. The process according to claim 1, wherein the triangle has a base length of between 80 and 200 mm, and a height of between 100-300 mm.

4. The process according to claim 1, wherein the angle between the base and the sides of said triangle is between 50 to 80 degrees.

5. The process according to claim 1, wherein said angle A is between 20 and 50 degrees.

6. The process according to claim 1, wherein the length of the incisions of iia and/or iib are is between 20 to 50 mm, or wherein the incisions in the base of the triangle have a length which is 10-40% of the length of the base of the triangle.

7. The process according to claim 1, wherein the incisions of iia and/or iib follow the bisector of the angle formed between base and sides of the triangle.

8. The process according to claim 1, further comprising the step of rolling the cut dough piece from the base to the top of the triangle, thereby forming a croissant shape.

9. The process according to claim 1, further comprising the step of freezing or deep-freezing said croissant.

10. The process according to claim 1, further comprising a proofing step.

11. The process according to claim 9, additionally encompassing a baking step of the frozen croissant.

12. The process according to claim 11, in which said baking step is carried out at a temperature ranging from 140 to 200° C.

13. The process according to claim 11, wherein prior to the baking step, a step of proofing or or of glazing or egg-washing is performed on the dough piece.

14. A croissant, obtained by the method according to claim 1, characterised in that it has split extremities.

15. The process according to claim 11, wherein the baking step is conducted in a conventional oven or a pulsed air oven, with or without steam.

16. The process according to claim 12, wherein said baking step is carried out for a period ranging from 12 to 30 minutes.

* * * * *